United States Patent [19]

Otstot et al.

[11] Patent Number: 4,517,720

[45] Date of Patent: May 21, 1985

[54] METHOD OF MOUNTING A FLUID SEPARATION MODULE IN A TUBULAR SHELL

[75] Inventors: Roger S. Otstot; Charles J. Runkle, both of Raleigh, N.C.

[73] Assignee: Monsanto Company, St. Louis, Mo.

[21] Appl. No.: 525,364

[22] Filed: Aug. 22, 1983

Related U.S. Application Data

[63] Continuation-in-part of Ser. No. 332,911, Dec. 21, 1981, abandoned.

[51] Int. Cl.³ ............................................. B21D 53/00
[52] U.S. Cl. .................................... 29/157 R; 29/445; 29/451; 29/455 R; 29/469; 29/522 R; 55/16; 55/158; 210/232; 210/321.1; 210/321.2; 210/323.2; 210/433.2; 210/450; 210/456
[58] Field of Search ............... 29/157 R, 445, 451, 29/455 R, 469, 522 R; 210/232, 321.1, 321.2, 321.3, 321.4, 321.5, 323.2, 433.2, 450, 456; 55/16, 158

[56] References Cited

U.S. PATENT DOCUMENTS

| | | | |
|---|---|---|---|
| 3,277,959 | 10/1966 | Withers | 29/157 R X |
| 3,339,341 | 9/1967 | Maxwell et al. | 55/158 X |
| 3,526,001 | 8/1970 | Smith | 210/321.4 X |
| 3,612,282 | 10/1971 | Cheng | 210/321.1 |
| 3,616,928 | 11/1971 | Rosenblatt | 55/158 X |
| 3,832,830 | 9/1974 | Gerow | 55/158 |
| 4,045,851 | 9/1977 | Ashare et al. | 29/157 R |
| 4,075,100 | 2/1978 | Furuta et al. | 210/321.2 X |
| 4,080,294 | 3/1978 | Edwards et al. | 210/232 |
| 4,219,426 | 8/1980 | Spekle et al. | 210/232 |
| 4,308,654 | 1/1982 | Bogart | 55/16 X |

Primary Examiner—Howard N. Goldberg
Assistant Examiner—Ronald S. Wallace
Attorney, Agent, or Firm—R. L. Broad

[57] ABSTRACT

A fluid separation module to be mounted in a cylindrical shell and the method of mounting the same, the module including a bundle of hollow fiber membranes and a polymeric tube sheet, the tube sheet being positioned at one end of the bundle of hollow fiber membranes with the hollow fiber membranes extending through the tube sheet. A resilient sheet having the form of the slit tube surrounds the bundle of hollow fibers and is held in this configuration by a plurality of rings encircling the slit tube at spaced intervals thereon, the slit tube being secured to the tube sheet. The rings are slideably mounted on the slit tube in such a manner that, as the module is inserted in the shell, the rings can be manually slid to one end of the slit tube to allow the slit tube to expand into contact with the inner surface of the tubular shell and thereby allow the fiber bundle to open for improved flow of the fluid mixture through the bundle.

6 Claims, 3 Drawing Figures

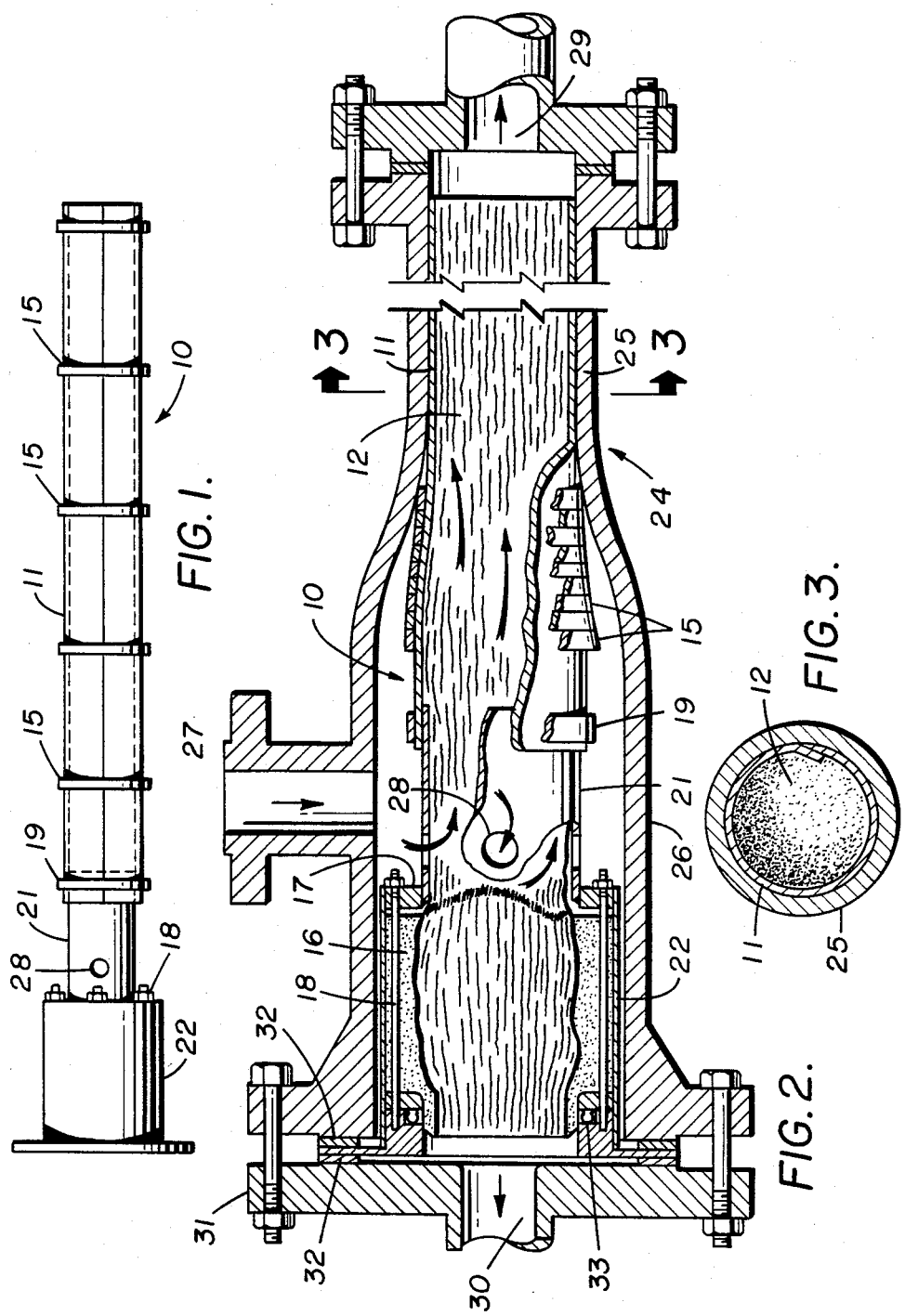

METHOD OF MOUNTING A FLUID SEPARATION MODULE IN A TUBULAR SHELL

BACKGROUND OF THE INVENTION

This is a continuation-in-part of application Ser. No. 332,911, filed Dec. 21, 1981, now abandoned, in the names of Roger S. Otstot and Charles J. Runkle for "FLUID SEPARATION MODULE".

FIELD OF THE INVENTION

This invention relates to methods for assembling fluid separation apparatus.

PRIOR ART

U.S. Pat. No. 3,526,001 discloses a permeation separation apparatus wherein a bundle of hollow fiber membranes positioned in a shell are enclosed in a porous, flexible sleeve. The sleeve, which is preferably in the form of a circular knit fabric, aids in handling the bundle of fibers. Tension on the sleeve serves to reduce the cross-sectional area of the fiber bundle to facilitate positioning the bundle in a jacket. Strapping such as rope or metal bands may be placed around the bundle at spaced intervals to compress the bundle for adjusting fluid flow through the bundle.

U.S. Pat. No. 4,219,426 discloses a dialysis device wherein a bundle of fibers mounted in a shell is compressed at spaced intervals by elastic rings which encircle the bundle. The purpose of such compression is to adjust fluid flow through the bundle.

U.S. Pat. No. 3,526,275 discloses a heat exchanger which utilizes a plurality of tubular elements surrounded by a rigid, perforated sleeve unit which has, as one of its purposes, protection of the tubular elements during shipment and handling of the unit. The sleeve is apparently made in rigid form primarily for protection of the tubular elements.

U.S. Pat. No. 3,339,341 discloses fluid separation apparatus wherein hollow fiber membranes are positioned within flexible and porous sleeve members which are apparently made of woven or non-woven fabric. The sleeve members are flexible such that they will deform to allow a plurality of such bundles to conform to the configurations of each other and a shell in which the bundles are placed.

U.S. Pat. No. 3,612,282 discloses a reverse osmosis separator unit having a number of composite membrane tubes positioned in a thin metal cannister which is mounted in a pressure vessel.

SUMMARY OF THE INVENTION

The method of mounting a fluid separation module in a cylindrical shell wherein the module is made up of a bundle of hollow fiber filaments which extend through a polymeric tube sheet, the tube sheet being positioned at one end of the fiber bundle. A resilient sheet in the form of a slit tube is secured to the tube sheet and surrounds the bundle of fibers, the slit tube being held in a tubular configuration by a plurality of manually moveable rings which encircle the slit tube and are positioned at spaced intervals thereon. In mounting the module in the cylindrical shell, the rings are moved along the slit tube to one end thereof, as the module is slid into the shell, to free the slit tube from restraint such that it expands into contact with the inner surface of the cylindrical shell.

DESCRIPTION OF THE DRAWINGS

FIG. 1 is a plan view of the module of this invention showing the spaced rings which retain a resilient sheet in a tubular configuration surrounding a bundle of hollow fiber membranes.

FIG. 2 is an enlarged cross-sectional view showing the module in operating position in a shell.

FIG. 3 is a cross-sectional view taken on line 3—3 of FIG. 2 showing the resilient sleeve in an expanded position in contact with the inner surface of the shell.

DETAILED DESCRIPTION OF THE INVENTION

Referring now in detail to the drawings, there is shown a resilient sleeve 11 surrounding a plurality of hollow fiber membranes 12 (FIG. 2) which are more permeable to one fluid of the mixture of fluids than other fluids in the mixture. The sleeve 11 is preferably made from a normally flat, resilient sheet of thin stainless steel which is wrapped around the bundle of fibers 12 to form a slit tube. The sleeve or slit tube 11, which is preferably imperforate, is held in this tubular configuration by a plurality of rings 15 which encircle the sleeve 11 and are spaced at intervals therealong as best shown in FIG. 1.

The resilience of the sleeve 11 is such that, if the rings 15 are removed, the sleeve will expand to a substantially larger diameter. The rings 15 are slideably mounted on the sleeve 11 so that they can be readily pushed to one end of the sleeve or slit tube 11 to allow the sleeve to expand in this manner.

By the term "resilient" we mean that the material from which the sleeve 11 is made has, when in the form of a thin sheet, the capability to substantially recover its original shape or form after being deformed from such original shape or form and then released. With such a resiliency the sleeve will of its own expand from the slit tube configuration essentially back to its original flat sheet configuration, provided that the yield point of the material of the sheet is not exceeded when the original flat sheet is rolled into a tubular configuration.

One end of the bundle of fibers 12 extends through a polymeric tube sheet 16 (FIG. 2) in a known manner. The hollow fibers are sealed at the other end of the bundle. A metal ring 17 secured to the tube sheet 16 by bolts 18 is welded to a tubular distribution element 21 which extends into the end of the slit tube 11. A hose clamp 19 of a known type surrounding the slit tube 11 where it overlaps the distribution element 21 serves to secure the slit tube to the distribution element 21. A metal tube 22 welded to the ring 17 surrounds the tube sheet 16 for protecting the tube sheet during handling of the module.

The above described apparatus makes up a module 10 which is, when the module is in operative position, mounted in a cylindrical steel shell 25 having an enlarged end portion 26 which is provided with an inlet opening 27 for the admission of a mixture of fluids, preferably a mixture of gases, from which one fluid is to be separated by permeation through the hollow fiber membranes to the bores thereof. The distribution element 21 is provided with ports 28 which allow the fluid mixture to flow into the fiber bundle from the inlet 27. The other end of the shell 25 is provided with an outlet opening 29 for discharge of the unpermeated fluids. The permeated fluid passes along the bores of the fibers through the tube sheet 16 and exits from the apparatus through an opening 30 in a cover plate 31 which is bolted to the end portion 26 of the shell. The permeated fluid cannot exit from the fibers through the sealed ends. Gaskets 32 and a seal 33 serve to prevent undesired leakage of the fluids.

In assembling the module 10 in the shell 25, the rings 15 can be manually moved to the end of the slit tube 11 as the module 21 is inserted in the shell. However, it is preferable to size the rings 15 in such a manner that the shell itself will move the rings to the positions shown in FIG. 2 as the module is slid into the shell.

The rings 15, which are preferably made of metal or a polymeric material, and have a rectangular cross-sectional configuration, have an inside diameter which is smaller than the inside diameter of the cylindrical shell 25 such that the slit tube 11 is held in a tubular configuration having a diameter less than the inner diameter of the shell 25. The outer diameters of the rings 15 are greater than the inner diameter of the cylindrical shell 25, such that the end of the cylindrical shell 25, where it is attached to the enlarged end portion 26, will engage the rings 15 and slide these rings along the module 10 as the module is inserted in the shell. The rings will, when the module is fully inserted into the shell, be in the positions shown in FIG. 2, with at least one of the rings being in contact with both the slit tube 11 and the inner surface of the shell in order to provide a seal for preventing the flow of fluids between the slit tube 11 and the shell 25.

In assembling the module 10 in the shell 25 the module is inserted into the shell through the enlarged end portion 26, the cover plate 31 being removed at this time. The rings 15 may be manually moved down the slit tube 11 as the module is inserted in the shell 25 or the module may be merely slid in the shell, with the end of the cylindrical shell 25 pushing the rings 15 along the slit tube 11 to the positions shown in FIG. 2 when the module is in operative position in the shell. This frees the sleeve 11 from confinement and allows it to expand into contact with the inner surface of the shell 25, which in turn allows the fiber bundle to open slightly for an improved flow of the fluid mixture through the bundle.

In removing the module from the shell for inspection, the rings are manually slid along the slit tube 11 to the approximate positions shown in FIG. 1 as the module is withdrawn from the shell. This holds the slit tube 11 in a tubular configuration and prevents it from springing open and spilling the fibers.

We claim:

1. The method of mounting a fluid separation module in a tubular shell having an enlarged end portion, comprising
   (a) providing a module comprised of
      (1) a bundle of hollow fiber membranes,
      (2) a tube sheet positioned at one end of the bundle of hollow fibers, said fibers extending through the tube sheet,
      (3) a resilient sheet having the form of a slit tube, said slit tube normally having an outer diameter greater than the inner diameter of the shell, said slit tube being secured to the tube sheet in a position surrounding the bundle of fibers, and
      (4) holding means in contact with the slit tube for confining said slit tube in a cylindrical configuration having an outer diameter smaller than the inner diameter of the shell, and for holding said bundle in a compressed state,
   (b) inserting the module into the shell through said enlarged end portion, and
   (c) releasing the slit tube from confinement by the holding means to allow said slit tube to expand into contact with the inner surface of the shell.

2. The method of claim 1 wherein the holding means is a plurality of rings encircling the slit tube at spaced intervals thereon, said rings being manually moveable on the slit tube so that said rings can be manually moved to one end of the slit tube to allow said slit tube to expand into contact with the inner surface of the shell.

3. The method of claim 2 wherein the rings have an inner diameter less than the inner diameter of the shell and an outer diameter greater than the inner diameter of said shell.

4. The method of claim 3 wherein the rings are slid along the slit tube to a location in said enlarged end portion when the module is in operative position in the shell.

5. The method of claim 4 wherein at least one of the rings is in contact with both the shell and the slit tube when the module is fully inserted in the shell.

6. The method of claim 4 wherein the slit tube is made from an imperforate sheet of stainless steel.

* * * * *